United States Patent [19]
Akiyama et al.

[11] 3,708,706
[45] Jan. 2, 1973

[54] MAGNETIC CORE ELEMENTS FOR ROTATING ELECTRICAL MACHINES

[75] Inventors: Yuji Akiyama; Yasuyoshi Ishii; Shigeo Ozawa; Saburo Takeshima, all of Mie-ken, Japan

[73] Assignee: Tokyo Shibaura Electric Co., Ltd., Kawasaki-shi, Japan

[22] Filed: Oct. 12, 1971

[21] Appl. No.: 188,263

[30] Foreign Application Priority Data

Oct. 13, 1970 Japan ........................ 45/90221

[52] U.S. Cl. .............................. 310/216, 31/259
[51] Int. Cl. ........................................ H02k 1/06
[58] Field of Search ................ 310/216–218, 259, 310/258, 92, 169; 29/596; 336/213, 233

[56] References Cited

UNITED STATES PATENTS

| 1,920,354 | 8/1933 | Carpenter | 310/217 UX |
|---|---|---|---|
| 2,845,555 | 7/1958 | Carpenter et al. | 310/216 |
| 2,908,965 | 10/1959 | Platt | 310/164 X |
| 3,436,812 | 4/1969 | Aoki et al. | 29/596 |

FOREIGN PATENTS OR APPLICATIONS

| 1,114,055 | 5/1968 | Great Britain | 310/259 |

*Primary Examiner*—D. F. Duggan
*Attorney*—Solon B. Kemon et al.

[57] ABSTRACT

Magnetic core elements for rotating electrical machines which are prepared by winding a magnetic steel strip several times while applying a sufficient pressure permanently to deform it into a flattened state so as to obtain a smooth surface on both sides of the resultant coil, spot welding the individual turns at least near the forward and rear ends of the coiled strip rigidly to form them into an integral body and punching a plurality of slots through which to insert the winding of a rotating electrical machine in a prescribed periphery of the coil.

1 Claim, 7 Drawing Figures

PATENTED JAN 2 1973 3,708,706

MAGNETIC CORE ELEMENTS FOR ROTATING ELECTRICAL MACHINES

BACKGROUND OF THE INVENTION

This invention relates to core elements for rotating electrical machines and more particularly to core elements for rotating electrical machines prepared by winding a magnetic steel strip several times while applying a sufficient pressure permanently to deform it into a flattened state and boring a periphery of the resultant coil with a plurality of slots through which to insert the winding of the rotating electrical machine.

A core element for rotating electrical machines is generally round and has its periphery perforated with slots through which to insert the winding of the electrical machine. A number of core elements are punched out of a large magnetic steel sheet and the core is prepared by superposing these elements. Therefore, this punching unavoidably gives rise to considerable scraps, extremely reducing the rate of utilizing the steel sheet. For example, where there is manufactured a core for a four-pole, 1.5 KW general purpose electrical motor, the steel sheet is only utilized to an extent of 55 to 58 percent in punching core elements.

To elevate the effective use of a steel sheet, there has been proposed a method of preparing a core which consists in boring in advance the edge of an originally manufactured narrow steel strip with a plurality of slots through which to insert the winding of a rotating electrical machine and winding the strip while applying a sufficient pressure permanently to deform it into a flattened state until the resultant flattened turns are laminated to a desired extent in the direction of the thickness of the strip. However, each turn has a tendency to be brought back to its original unwound state due to the residual stress resulting from the winding force to which it was initially subjected. With time, therefore, a core thus prepared becomes distorted. Further, the stress derived from the punching of the slots leads to variation in the outer and inner diameters of the coiled core, with the resultant failure to effect the satisfactory alignment of the slots of the laminated turns. Accordingly, the core according to the proposed method presents difficulties in being used with a rotating electrical machine, for example, an induction motor where there should be provided as close a clearance as possible between the stator and rotor, though it may be applicable to a D.C. or synchronizing rotating electrical machine where said clearance has a relatively large latitude. Therefore, the aforesaid proposed core has not yet been put to practical application.

Another type of core proposed to date is formed by helically winding a steel strip which is not previously bored with slots through which to insert the winding of a rotating electrical machine while similarly applying a sufficient pressure permanently to deform it into a flattened state; cutting off each turn of the helical coil during said winding step; and punching the slots in each cut off turn. This type of core permits the easy alignment of the winding slots and the improved roundness of its periphery, but still presents difficulties in being used with a rotating electrical machine for example, an induction motor where there should be allowed as close a clearance as possible between the stator and rotor.

The first mentioned core of the prior art has the drawback that a core formed by winding a previously slotted steel strip presents a polygonal periphery corresponding to the number of slots, formed, and moreover has different yield conditions between the slot bottom and the other nonslotted portions of the strip, presenting difficulties in aligning the slots of one turn with these of another due to the deformation resulting from said different yield conditions.

SUMMARY OF THE INVENTION

It is accordingly an object of this invention to provide a magnetic core element which is prepared by winding a steel strip several times while applying a sufficient pressure parmanently to deform it into a flattened state so as to obtain a smooth surface on both sides of the resultant coil, jointly fixing the turns thereof at least near the forward and rear ends of the coiled strip and punching a plurality of slots through which to insert the winding of a rotating electrical machine in a prescribed periphery of the coil.

Another object of the invention is to provide a method for manufacturing said coil elements.

Still another object of the invention is to provide an apparatus for manufacturing said coil elements.

A core element according to this invention is prepared by winding a magnetic steel strip several times so as to laminate the individual turns of the resultant coil in the direction of the thickness of the strip. The forward and rear ends of the coiled strip face each other across an imarginary line parallel with the direction of the thickness of the laminate. The intermediate section of a laminated strip is bent at two close points facing its forward and rear ends through the same angle in opposite direction to an extent totally corresponding to the thickness of the strip itself so as to render the nonbent parts of said intermediate section parallel with each other, thereby forming a stepped portion. The forward and rear ends of the coiled strip are disposed opposite to each other across said stepped portion. The laminated turns of the coil are spot welded at least near said forward and rear ends rigidly to form them into an integral body so as to obtain a substantially smooth surface on both sides of the coil. A coil element thus prepared is finally bored in a prescribed periphery with a plurality of slots through which to insert the winding of a rotating electrical machine.

A core having a sufficient thickness for actual use with a rotating electrical machine is constructed by further superposing a proper number of the aforementioned core elements with the slots thereof accurately aligned. In said superposition it is preferred that the aforesaid stepped portion defined between the forward and rear ends of a coiled strip constituting each core element be not arranged on the same line parallel with the direction in which there are superposed said core elements.

The preferred method of manufacturing core elements comprises the step of winding a magnetic steel strip so as to be laminated in the direction of the thickness of the strip. During this step, the steel strip is subjected to a desired permanent deformation to facilitate the execution of the succeeding steps.

The laminated steel strip is drawn out in a helical form, starting with its forward end. That portion of the wound strip which represents a desired number of turns is cut off to form a unit coil. The coil is subjected on both sides to a sufficient lateral pressure to be permanently deformed into a flattened state with the inner and outer diameter of the coil maintained at a prescribed value. Upon completion of said permanent deformation, the turns of the coil are welded together into an integral body at least near the forward and rear ends of the coiled strip with the lateral pressure still applied. The flattened coil consisting of said welded turns is perforated in a prescribed periphery with a plurality of slots through which to insert the winding of a rotating electrical machine.

A unit magnetic core element thus prepared is prominently improved in dimensional precision and well adapted for use with a rotating electrical machine where there should be provided as close a clearance as possible between the stator and rotor.

DESCRIPTION OF THE PREFERRED EMBODIMENT

Figure 1:
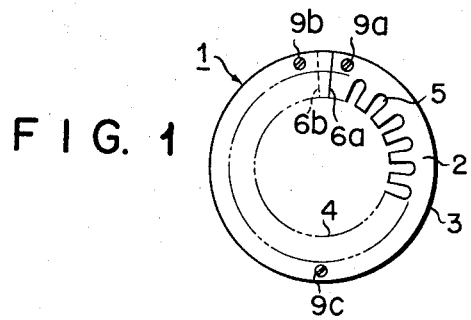
FIG. 1 is a plan view of a unit core element according to an embodiment of this invention.
Figure 5:
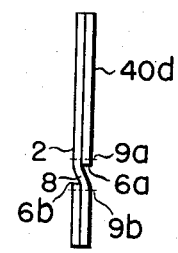
FIG. 5 is a side view of the core element where its flattened turns are welded together in several places.

Referring to FIG. 1, numeral 1 represents a unit core element according to this invention which is prepared by winding, for example, twice a steel strip 2 of prescribed width to be laminated in the direction of its thickness so as to form a unit coil element, its outer and inner peripheries being indicated by numerals 3 and 4 respectively. The inner periphery 4 is perforated with a plurality of slots 5 through which to insert the winding of a rotating electrical machine. As shown in FIG. 5, the forward and rear ends 6a and 6b of the coiled strip 2 closely face each other across an imarginary line parallel with the direction in which the turns of the coil are laminated. The intermediate section of the laminated strip 2 is bent at two close points facing its forward and rear ends 6a and 6b through the same angle in opposite directions to an extent totally corresponding to the thickness of the strip itself so as to render the nonbent parts of said intermediate section parallel with each other, thereby forming a stepped portion 8 between said forward and rear ends 6a and 6b. As previously mentioned, the coil 1 is subjected to a sufficient lateral pressure to have its turns permanently deformed into a flattened state so as to obtain a smooth surface on both sides of said coil 1. The turns are spot welded into an integral body at two points 9a and 9b near the forward and rear ends 6a and 6b of the coiled steel strip 2 respectively and at another point 9c preferably disposed opposite to the first mentioned points 9a and 9b. Upon completion of said spot welding, the slots 5 are press punched. The number of turns constituting the unit core element 1 is not limited to two turns, so long as the perforation of the slots 5 is not obstructed. A desired number of unit core elements 1 are further superposed with the slots accurately aligned finally to provide a stator core for a rotating electrical machine. If the outer periphery 3 of the unit core element 1 is bored with the slots 5, the resultant core will be adapted for use with a rotor. In either case, it is preferred that said superposition of the core elements 1 be effected with the stepped portion 8 defined between the forward and rear ends of the laminated strip of the respective core members 1 properly displaced from one another in a lengthwise direction.

Figure 2:
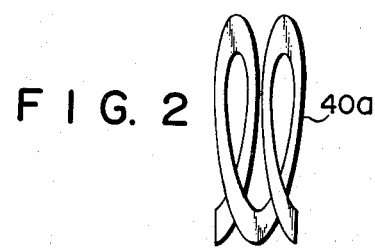
FIG. 2 is a perspective view of a helical coil or unit core element prepared by cutting off that portion of the wound steel strip which represents a prescribed number of turns.
Figure 6:
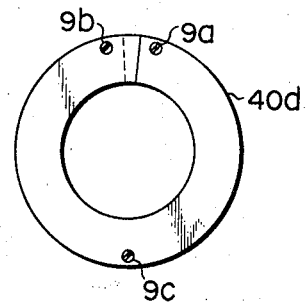
FIG. 6 is a plan view of the core element of FIG. 5.
Figure 7:
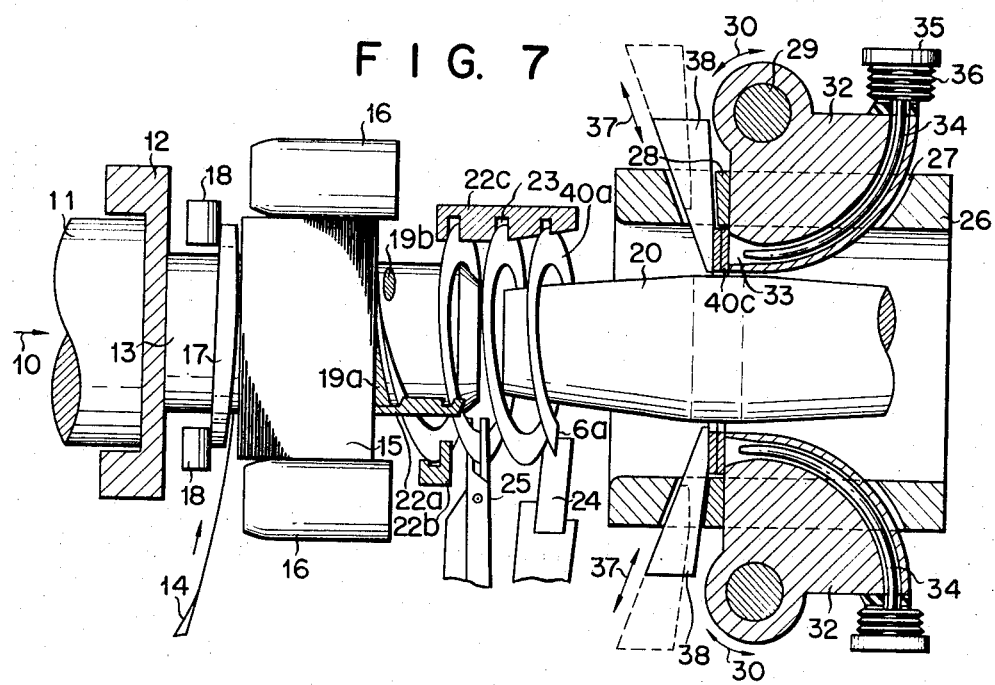
FIG. 7 is a schematic side view, partly in section, of an apparatus for continuously manufacturing the core element of FIG. 5 from a magnetic steel strip.

The unit core element 1 may be manufactured with an apparatus illustrated in FIG. 7 and through the steps described by reference to FIGS. 2 and 6. Referring to FIG. 7, numeral 11 represents a shaft connected to a source of drive power so as to rotate clockwise as viewed in the direction of the arrow. To the forward end of the shaft 11 is connected through a joint 12 the later described rotating mandrel 13 whose diameter is designed to define the inner diameter of the coil element 1. A steel strip 14 is supplied to the rotating mandrel 13 to be wound about it in a closely laminated form so as to form a coil 15. Around the periphery of the rotating mandrel 13 are concentrically disposed a plurality of rollers 16 rotating in the direction in which the steel strip 14 is wound about the mandrel 13 so as to apply pressure to the periphery of the coil 15. There is further provided a pressurizing plate 17 which rotates while pressing the side of the steel strip 14 against the side of the coil 15 so as to help the strip 14 to be properly wound about the mandrel 13. In addition, there are provided a plurality of lateral pressure rollers 18 so as to press said pressure plate 17 against the coil 15. There are further provided guide members 19a and 19b for successively drawing out the coil 15 in a helical form, starting with its forward end. There are used other guide members 22a, 22b and 22c for feeding the helical coil thus drawn out to another mandrel 20 with a prescribed pitch allowed between the adjacent turns. The latter guide members 22a, 22b and 22c are perforated with slots 23 to define said pitch. There are also provided a limit switch 24 for detecting the forward end 6a of the helical coil and a cutter 25 for cutting off upon receipt of a detection signal from the limit switch 24 that portion of the helical coil which represents a required number of turns for a unit helical coil.

The second mandrel 20 is disposed concentrally with the first mandrel 13, the lengthwise central portion of which has a diameter for defining the inner diameter of the helical coil, said diameter being progressively reduced toward both ends of said mandrel 20. Concentrically with the mandrel 20 is disposed a guide cylinder 26 whose inner diameter is designed to limit the outer diameter of the unit core element 1 of FIG. 1. Said guide cylinder 26 has a plurality of lengthwise slits bored in the outer wall. At that part of each slit 27 which faces the maximum diameter of the mandrel 20 is disposed a stopper so as to cross the slit in the peripheral direction of the guide cylinder 26. There are provided a plurality of rotating pressurizing members 32, each of which is pivoted about a fixed shaft 29 so as to oscillate in the direction of the arrows 30 through that part of the slit 27 which is disposed on the indicated right side of the stopper 28. The clockwise rotation of the pressurizing member 32 is limited by the stopper 28. The pressurizing member 32 has an arcuate guide hole 33 perforated inside the periphery. An arcuate electrode 34 is made to travel through said arcuate guide hole 33 in a state insulated from the pressurizing member 32 by means of a pressurizing plate 35 and an elastic member 36. There is provided a tightening member 38 which is made to move in the directions of the arrows 37 through that part of the slit 27 which is positioned on the indicated left side of the stopper 28.

Figure 3:
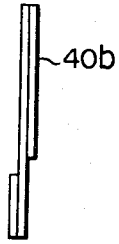
FIG. 3 is a side view of the core element where the helical coil of FIG. 2 is compressed with a lateral pressure to have its turns flattened.
Figure 4:
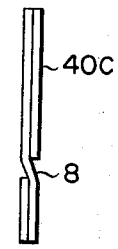
FIG. 4 is a side view of the core element where it is subjected to a further lateral pressure to have both sides permanently deformed into a smooth surface.

Now for convenience, each cut off helical coil consisting of a desired number of turns is designated as 40a (FIG. 2), a coil obtained simply by compressing the coil 40a is indicated as 40b (FIG. 3), a coil obtained by applying a lateral pressure to the coil 40b permanently to deform it into a flattened state so as to provide a smooth surface on both sides is denoted as 40c (FIG. 4), and a coil derived from the spot welding of the turns of the coil 40c at several points in referred to as 40d. Referring to FIG. 7, the aforesaid rotaing pressurizing member 32 and tightening member 38 are so positioned as to spot weld the turns of the coil 40c while said coil 40c is subjected to a lateral pressure for permanent deformation. Between the arcuate electrode 34 and the tightening member 38 is disposed a source of welding power (not shown). However, said spot welding may be effected by utilizing the rotating pressurizing member 32 as one electrode and the arcuate electrode 34 as the other.

The unit core element 1 is manufactured by the undermentioned series of steps. The steel strip 14 continuously fed to the apparatus is closely wound into the coil 15 having the prescribed inner and outer diameters while being permanently deformed by the movement of the rotating mandrel 13, peripheral pressure rollers 16 and lateral pressure rollers 18. The closely wound coil 15 is successively drawn out, starting with its forward end by the action of the guide members 19a, 19b, 22a, 22b and 22c in the form of a helical coil whose turns are spaced at a prescribed pitch. When the forward end of the helical coil is brought to the position of the limit switch 24, that portion of the helical coil which represent a required number of turns for a unit coil is cut off by the cutter 25, obtaining a unit coil element 40a. The number of turns to be cut off each time may be freely chosen. At a prescribed point of time, the operating surface of the rotating pressurizing member 32 is brought into an annular space defined by the peripheral surface of the mandrel 20 with the inner wall of the guide cylinder 26. The cut off helical coil 40a is conducted to the operating surface of the rotaing pressurizing member 32 along the periphery of the mandrel 20 by a electromagnetic device or feed means using compressed air (not shown). The tightening member 38 is urged from a position marked by the dotted lines to that defined by the solid lines illustrated in FIG. 7 to press the helical coil 40a against the operating surface of the pressurizing member 32. Since said pressurizing member 32 is driven clockwise, the helical coil 40a is permanently deformed under pressure into the coil 40c through the form 40b of FIG. 3. While this pressure is applied, the arcuate electrode 34 rotates clockwise by means of the pressurizing plate 35 to spot weld the turns of the coil 40c at the aforesaid prescribed points 9a, 9b and 9c. Upon completion of spot welding, the pressurizing member 32 and the tightening member 38 are brought back to their original positions and there is taken out the coil 40d spot welded at the points 9a, 9b and 9c shown in FIG. 5. The coil 40d is perforated with slots by the known punching means.

This invention is not limited to the aforementioned embodiment, but includes any other modification which does not depart from the scope and object set forth in the claims.

What we claim is:

1. Magnetic core elements for rotating electrical machines consisting of a coil of several turns formed by winding a magnetic steel strip in a laminated form in the direction of the thickness of said strip; comprising a peripheral portion with a plurality of slots to insert windings of said rotating electrical machine, forward and rear ends of said coiled strip facing each other across an imaginary line parallel with the direction in which said turns of said coil are laminated, an intermediate stepped portion having a depth equal to the thickness of said strip itself and two bent portions at said forward and rear ends, said stepped portion oppositely facing said forward and rear ends, thereby obtaining a smooth surface in both sides of said coil, and welded portions which join said turns at at least two points near said forward and rear ends of said coiled strip.

* * * * *